Aug. 11, 1953　　　　T. B. DALTON　　　　2,648,180
WRAPPING MACHINE
Filed May 27, 1948　　　　　　　　　　　　7 Sheets-Sheet 1

FIG.I.

INVENTOR.
THOMAS B. DALTON
BY
ATTORNEYS

Aug. 11, 1953  T. B. DALTON  2,648,180
WRAPPING MACHINE
Filed May 27, 1948  7 Sheets-Sheet 4

INVENTOR.
THOMAS B. DALTON

ATTORNEYS

Aug. 11, 1953     T. B. DALTON     2,648,180
WRAPPING MACHINE Filed May 27, 1948     7 Sheets-Sheet 5

INVENTOR.
THOMAS B. DALTON.
BY
ATTORNEYS

Aug. 11, 1953                T. B. DALTON                2,648,180
                             WRAPPING MACHINE
Filed May 27, 1948                                    7 Sheets-Sheet 7

INVENTOR.
THOMAS B. DALTON

BY
ATTORNEYS

Patented Aug. 11, 1953

2,648,180

UNITED STATES PATENT OFFICE 2,648,180

WRAPPING MACHINE

Thomas B. Dalton, Montague, Mich., assignor, by mesne assignments, to Valley Research Corporation, Montague, Mich., a corporation of Michigan Application May 27, 1948, Serial No. 29,435

5 Claims. (Cl. 53—32)

My invention relates to packaging machinery and more particularly to a machine for wrapping butter and other food parcels such as frozen foods and other food products.

Much difficulty has arisen in the packaging of food products such as butter and frozen food parcels, in that rather costly cartons are required or other types of packaging material which make it necessary to provide food parcels of excess weight to allow for shrinkage due to the fact that it is not possible to tightly seal the food in the package. Various types of pressure sensitive wrapping materials are used in packaging food parcels, but such processes are slow and uneconomical, and do not tightly seal the food. In general, the processes now employed in the industry require several machines to complete the packaging of the food parcels, much handling, and consequently the packaging of these food parcels is only had with a great deal of labor and expense.

It is an object of my present invention to minimize the expense for packaging food parcels such as butter and frozen foods, by constructing a packaging machine in which preformed food parcels are successively processed to completely encase same in a sheet of wrapping material which is folded about the parcel and then passed under heaters and pressure plates to heat seal the package. More particularly, I attain the above by constructing a machine which embodies a rotary conveyor which conducts the food parcels to a plurality of stations where various mechanisms, operated in timed relation with the machine, serve to completely package the food parcel.

Another object of the present invention is to facilitate the packaging of butter, frozen food and other food parcels by providing a compact organization and assembly of various instrumentalities, so constructed and arranged as to convey the food parcel and successively process same, some of the various instrumentalities being so timed with machine operation as to be actuated when the rotary conveyor is momentarily at rest.

A still further object of my invention is to provide for more efficient operation of a machine for packaging butter, frozen foods or other food products by constructing said machine with mechanisms which are actuated only when the food parcels to be wrapped are being fed to the machine, said mechanism controlling the feeding of the wrapping material to said machine, and more particularly the control comprises a trip actuated by the food parcels as they are conveyed into position for injection to the machine, said trip actuating a clutch means controlling the operation of said injecting means.

For a more detailed understanding of my invention reference may be had to the accompanying drawings, illustrating a preferred embodiment thereof, in which like characters refer to like parts throughout the several views, and in which.

The machine is constructed and arranged for packaging or wrapping butter, frozen foods, or other similar preformed food products, same being preferably shaped to standard sizes and weights and automatically fed through the machine which is provided with various mechanisms which are actuated to fold and seal the wrapping material about the food package or parcel.

The machine is mounted on a frame structure 10, which structure is supported on rollers or casters 11, which make it possible to move the machine about the factory and to position same in the manner most convenient to the particular layout and with relation to other machines which operate in conjunction therewith.

A motor M is supported on the frame structure and drives a belt 12 through a standard slipping clutch 13, which belt is connected with a driven wheel 14 connected through a suitable transmission to various shafts which drive the machine elements. The main drive shaft 16 connected with the output of the transmission 15 drives the main rotary conveyor 17 through suitable gearing which will hereafter be described in more detail, and is drivingly connected by the chain 18 to an auxiliary driving unit 19. The drive shaft 16 carries a pinion 20 meshing with a gear 21 mounted on the shaft 22 which carries the rotary conveyor 17.

Gear 23 carried by shaft 16 meshes with gear 24 which is in turn connected off center with a walking beam 25. The other end of the beam 25 is connected as at 26 with the bracket 31 mounted on shaft 22. A gear 29 is pinned to gear 27 as at 30 and shafts 22 and 28 are connected by means of bracket 31.

In the drawings, these various gears are identified with the number of teeth which one carries, so that one can easily trace the proper speed reduction which is imparted to shaft 22. The gear 32, which is keyed to shaft 22, meshes with the gear 27.

In the operation of the machine, the drive shaft 16 and the gears 23 carried thereby rotate at a constant speed. Also gears 27 and 29 are rotated about their individual common axis at a constant speed, but due to the reciprocating motion of walking beam 25, the gear 27 is periodically rolled backwards with respect to gear 21, thereby imparting an intermittent rotary motion to gear 32 and the shaft 22 keyed thereto. Thus the rotary conveyor 17 is given an intermittent motion and the rotary food conveyor comes momentarily to rest at predetermined regular intervals.

The reason for this particular intermittent motion of the rotary conveyor is to permit the placing of the preformed food parcels in the carriers and the carrying on of various operations to the packaging, which operations are such that they can only be performed when the food parcel is at rest or substantially at rest.

The initial feed of the food parcels to the machine is had by mechanism driven from the auxiliary transmission 19. The chain 18 drives a sprocket 35A carried by sleeve 36 mounted on shaft 37. Thus the sleeve 36 is driven at a constant speed and the shaft 37 is driven thereby through a clutch mechanism consisting of a driven member 36A which is pinned to shaft 37 and a pawl 38 carried by pivotal support 39 on a driven member 40.

A cam 41 is positioned to engage the pawl and to keep same out of engagement with slot 42 carried by the constantly rotating member 40. When the pawl 41 is retracted, the spring 43 urges the pawl into the slot 42 and thus drivingly connects the driving member 40 with the driven member 36A, which is pinned to shaft 37 and as long as this pawl is held in this engagement, the shaft 37 will be actuated and the shaft thus continuously rotated. Preferably sleeve 36 is pressed into sprockets 35 and 35A and 40. A chain 45 is driven from sprocket 35 carried by sleeve 36 to drive pulley 46 which drives the conveyor 47 supported on the frame 48 carried by the main machine frame 10. This chain 45, driven by sleeve 36, which is continuously rotated, thus moves the conveyor 47 continuously, and any butter, frozen food parcel, or other preformed shape or product carried thereby is fed toward the machine.

As these parcels are moved toward the machine, they will engage a trip 50 which is in turn carried by a shaft 51 which is thus partially rotated, and actuates the arm 52 attached to cam 41, which action serves to withdraw the cam 41 from engagement with the pawl 38, allowing same to fall into slot 42 and thus drivingly connect the shaft 37 to the source of power. From this shaft 37 is driven a worm gear 53 which meshes with another worm gear 54 which drives a crank 55 that operates the drag link 56 attached to a ram 57. This ram is thus actuated to transfer the food parcel or other preformed shape of food product which is to be packaged from the support 58, where it is positioned after being pushed off the conveyor 47 into a position aligned with the rotary conveyor 17. Timed with the operation of ram 57 is another ram 60 which is actuated by means of the crank 61 through the linkage 62.

The operation of the rotary conveyor is such that it comes to rest just at the time the ram 60 is actuated, so that the food parcel may be injected into the U-shaped carrier 65 carried by said rotary conveyor, or wheel 17. The wheel is then put into motion and indexes so as to bring the next succeeding carrier 65 into alignment with the ram 60 and each carrier thus receives a food parcel as long as same is being fed to the machine.

The feeding of the wrapping material to the machine is arranged so that a prefabricated sheet of the wrapping material is fed to a location immediately ahead of ram 60 so that the food parcel is rammed against the sheet and partially enfolded thereby as same is injected into the carrier 65.

This mechanism for feeding the wrapping material to the machine is actuated from the shaft 37 to which is secured a two-piece adjustable crank 70, the arm 71 of said crank being adjustable with respect to arm 70 so as to vary the throw and timing of the link 72 which is connected with the crank 73 secured to shaft 74 of the wrapping material feeding mechanism.

The shaft 74 is supported on a bracket 75 carried by the frame structure 76 which supports a stack of sheets of the wrapping material, indicated at 77. The arm 78 is secured to this shaft 74 and as the shaft is rocked because of the reciprocation of the rod 72, the tip 79 of the arm 78, which is constructed of rubber or other suitable material, engages the bottom sheet and moves the same into the recess 80, thus freeing the forward edge of said sheet from the support 81, and permitting same to fall down as shown by the dotted line position 82.

Figures 15, 16, 17:
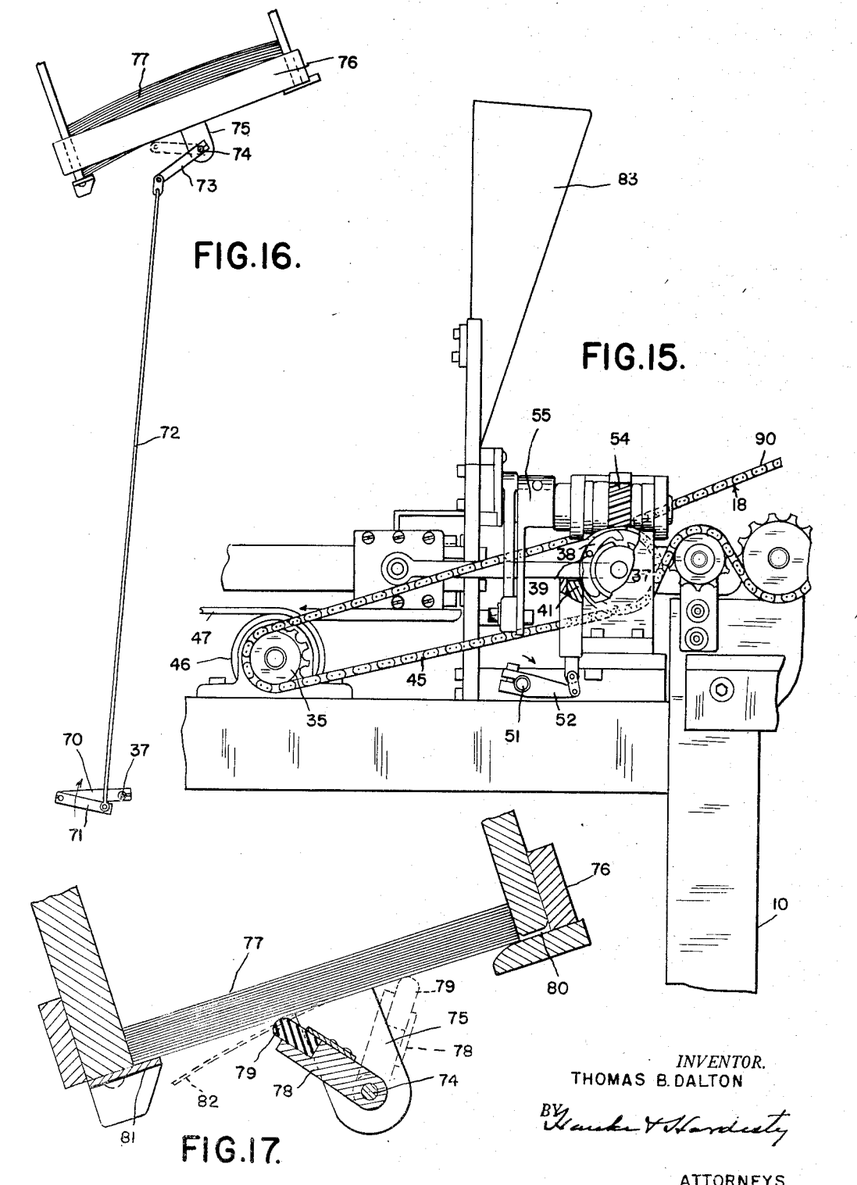
Fig. 15 is an enlarged fragmentary side elevational view of the feeding means and the control therefor.
Fig. 16 is a fragmentary elevational view of the paper feeding mechanism.
Fig. 17 is a detail sectional view thereof, showing how a single sheet of wrapping material is stripped off from beneath a stack and fed to said machine.
Figure 18:
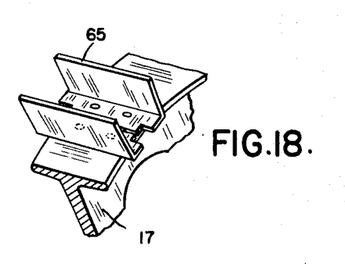
Fig. 18 is a detail perspective view of one of the food parcel supports carried by the machine rotary conveyor.

Now, as the arm 78 is returned to its forward position, as shown in solid lines in Fig. 17, the sheet is forced out of recess 80 and into a chute 83 which conducts the same to a position immediately ahead of the ram 60.

Figure 14:
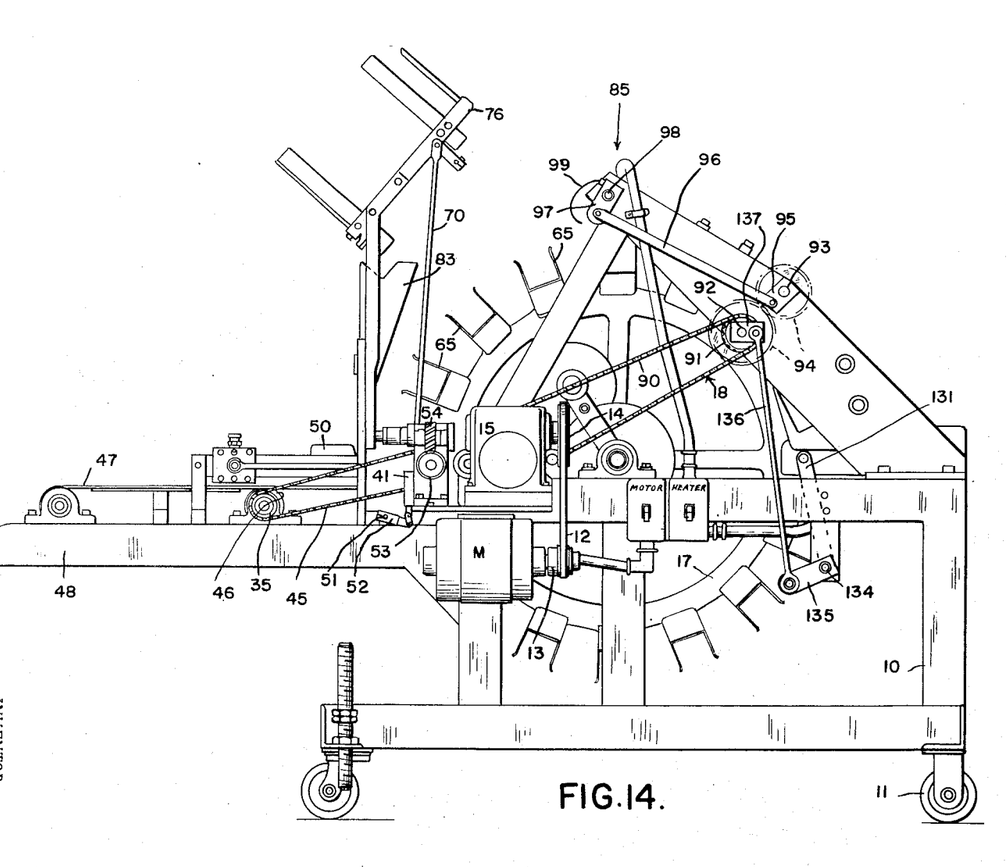
Fig. 14 is a side elevational view of the machine.

The food parcel is thus forced into the carrier 65 carrying with it the wrapping material 77 and the rotary conveyor is subsequently indexed until such time as it reaches a position indicated by the arrow 85, Fig. 14, where the mechanism for folding over the upper flaps of the wrapping material is located. A chain drive from the shaft 16 and shown in Fig. 14 by reference character 90 drives a sprocket 91 secured to shaft 92. Shaft 92 is drivingly connected with shaft 93 by any suitable means such as gears 94. A crank 95 secured to shaft 93 operates the connecting rod 96 secured to crank 97 and thus serves to oscillate the shaft 98 which carries a finger 99 which acts to fold in the rear flap 100 of the wrapping material which projects upwardly out of the carrier 65. The beginning of the action of this finger 99 which folds in the wrapping material commences while the carrier 65 is substantially at rest.

Figures 9, 10, 11:
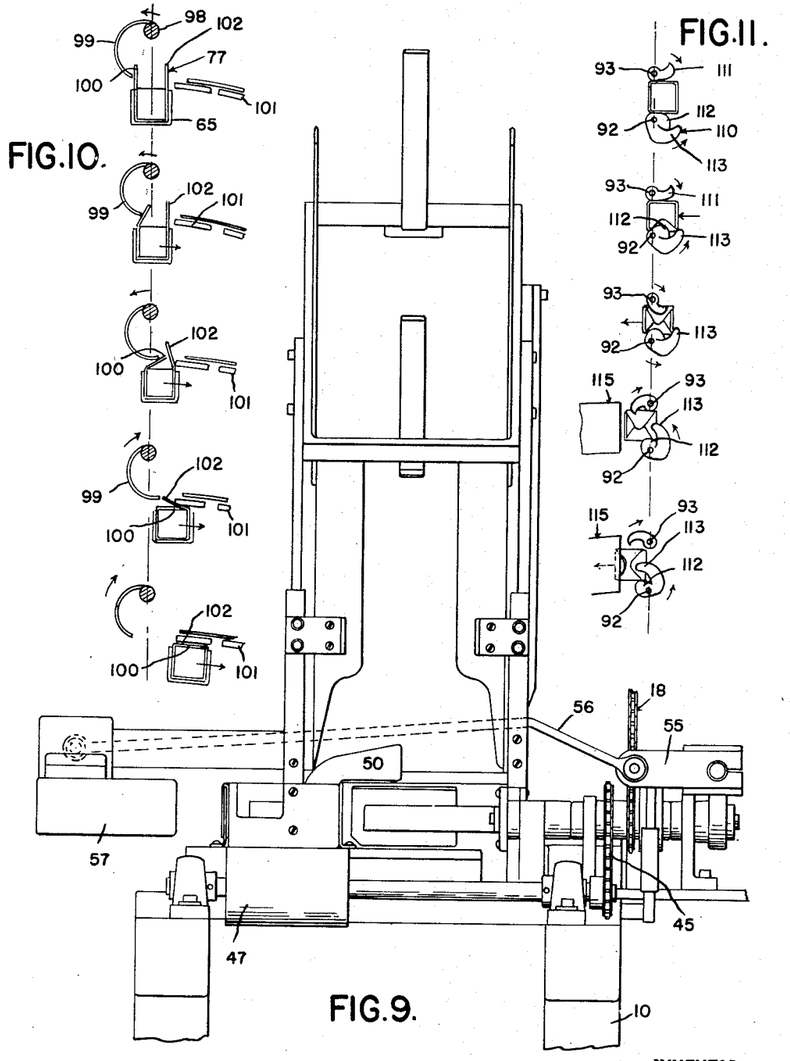
Fig. 9 is the feed in end elevational view of the machine.
Fig. 10 is a diagrammatic view showing in detail the operation of folding the top extensions of the wrapping material over said food parcel and showing how said operation is timed to the machine operation.
Fig. 11 is another diagrammatic view showing the series of steps in the folding of the end flaps over said food parcel and also showing how this operation is timed to the machine operation.
Figure 12:
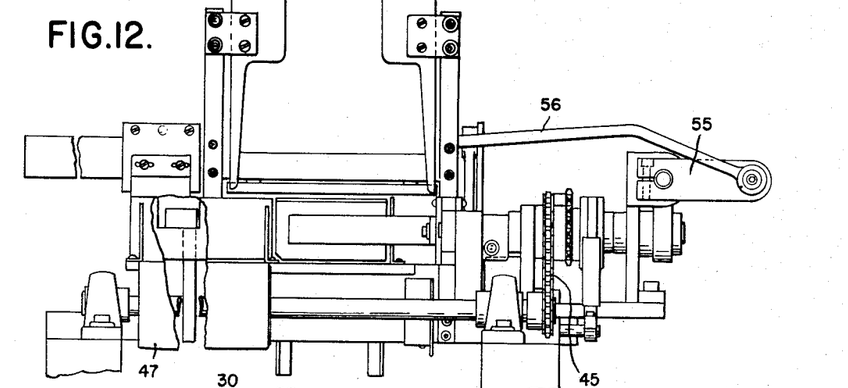
Fig. 12 is a fragmentary feed in end elevation of the machine, showing some of the machine actuating means in another position.
Figure 13:
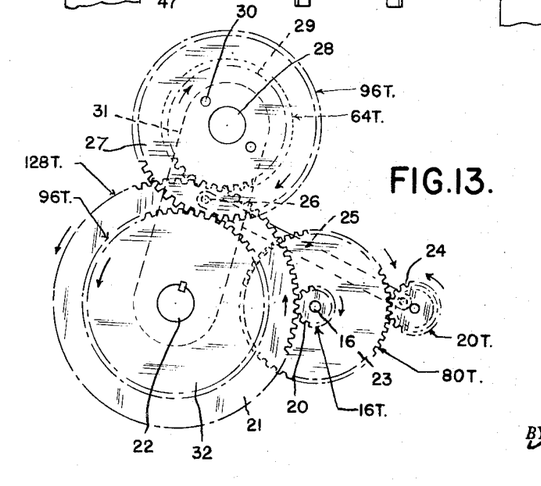
Fig. 13 is a diagrammatic fragmentary detail view of the mechanism which drives the rotary conveyor.

In Fig. 10 I have illustrated the various steps in the folding over of these upwardly extending flaps. This figure shows the finger 99 advancing with respect to the food parcel and pushing over the rear flap and holding same there in position until the food parcel begins to pass under the heating element 101 which engages the forward flap 102 and pushes same over on top of the rear flap 100. The finger 99 begins to withdraw as the food parcel is conveyed away from it and under the heater. The heater is of standard construction and applies thermostatically controlled heat and pressure to these flaps, thus heat sealing same together. The pressure on these flaps is applied in the customary manner by the springs 103 which urge the heating elements 101 into heat sealing contact with the flaps 100 and 102.

The shafts 92 and 93 respectively carry end folding fingers 110 and 111 respectively. These fingers 110 and 111 are so located and secured to shafts 92 and 93 so as to time their operation with respect to each other and with respect to the travel of the food parcel in juxtaposition therewith.

Fig. 11 diagrammatically illustrates the operation of this means for folding in the end flaps of the package. The finger 110 is of a compound construction and comprises an ear 112 and a longer ear 113. As shaft 92 is rotated, it moves the fingers in the direction as indicated by the arrow and causes the ear 112 to engage the lower end flap and begin to fold same upon the end of the food parcel. As the food parcel moves in the direction indicated, the finger 111 engages the upper end flap and folds same downwardly until same overlies the lower end flap.

At this time the package is moving more rapidly and the long finger 113 now engages the rear end flap and pushes same over the folded lower and upper flaps and holds same in position as the food parcel is moved into the heater 115 which bends back and folds the forward end flap over said other folded end flaps. Said long finger 113 in folding over the rear flap, moves at a greater lineal speed than the conveyor.

Figure 1:
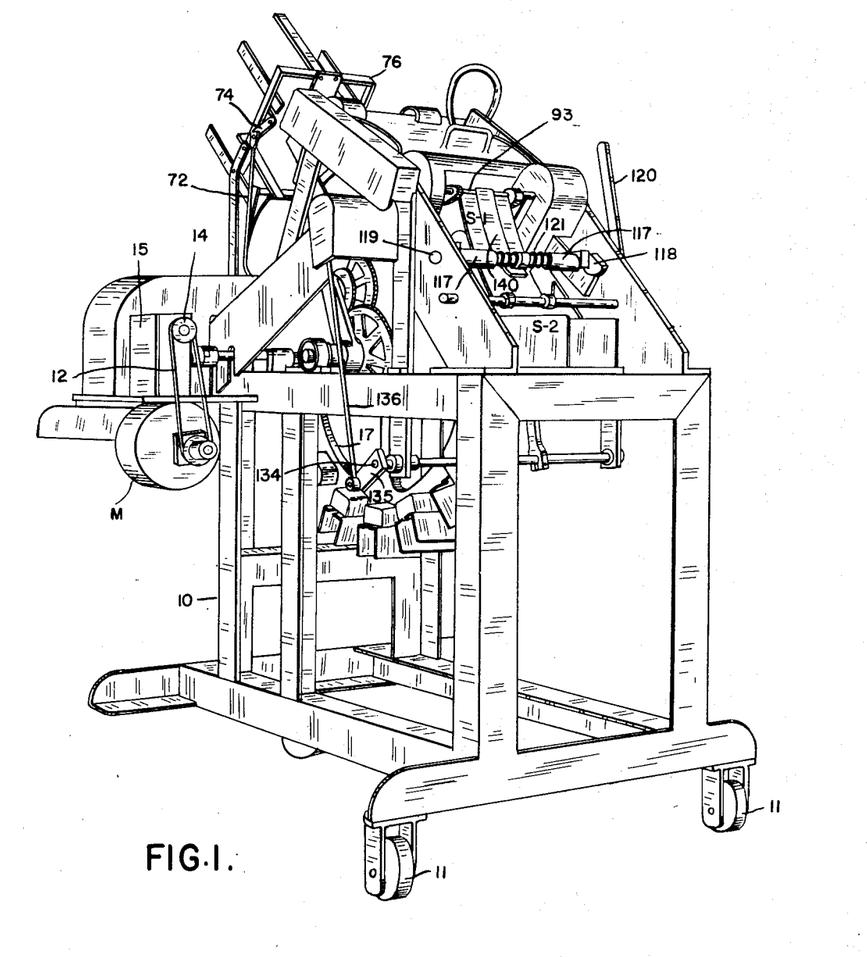
Fig. 1 is a perspective view of my improved packaging machine, as seen from the side carrying the means of power.
Figures 2, 3, 4:
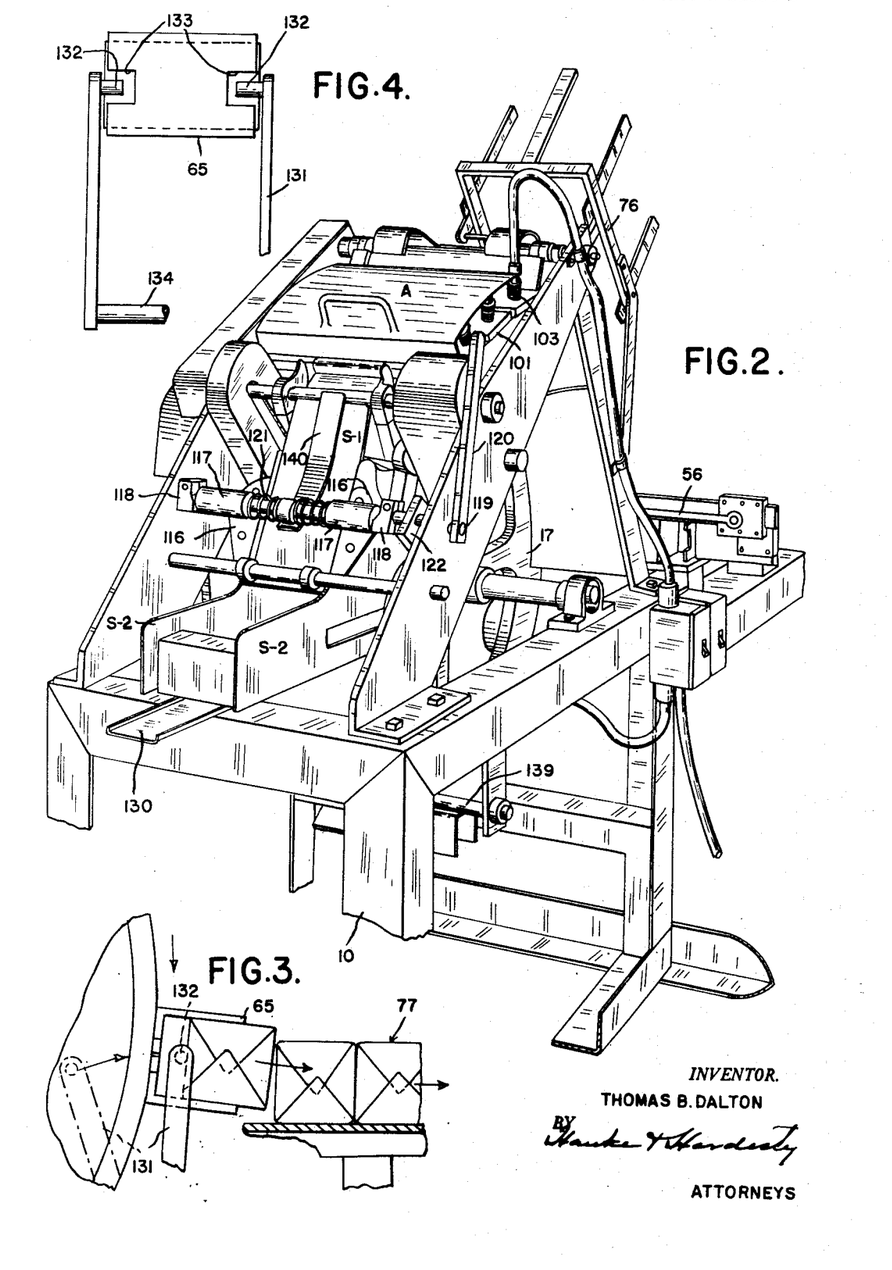
Fig. 2 is a perspective view of my improved packaging machine as seen from the opposite side.
Fig. 3 is a fragmentary detail side elevational view showing the means for ejecting the wrapped food parcel from the machine.
Fig. 4 is a further fragmentary detail elevational view of the ejecting means.
Figures 5, 6, 7:
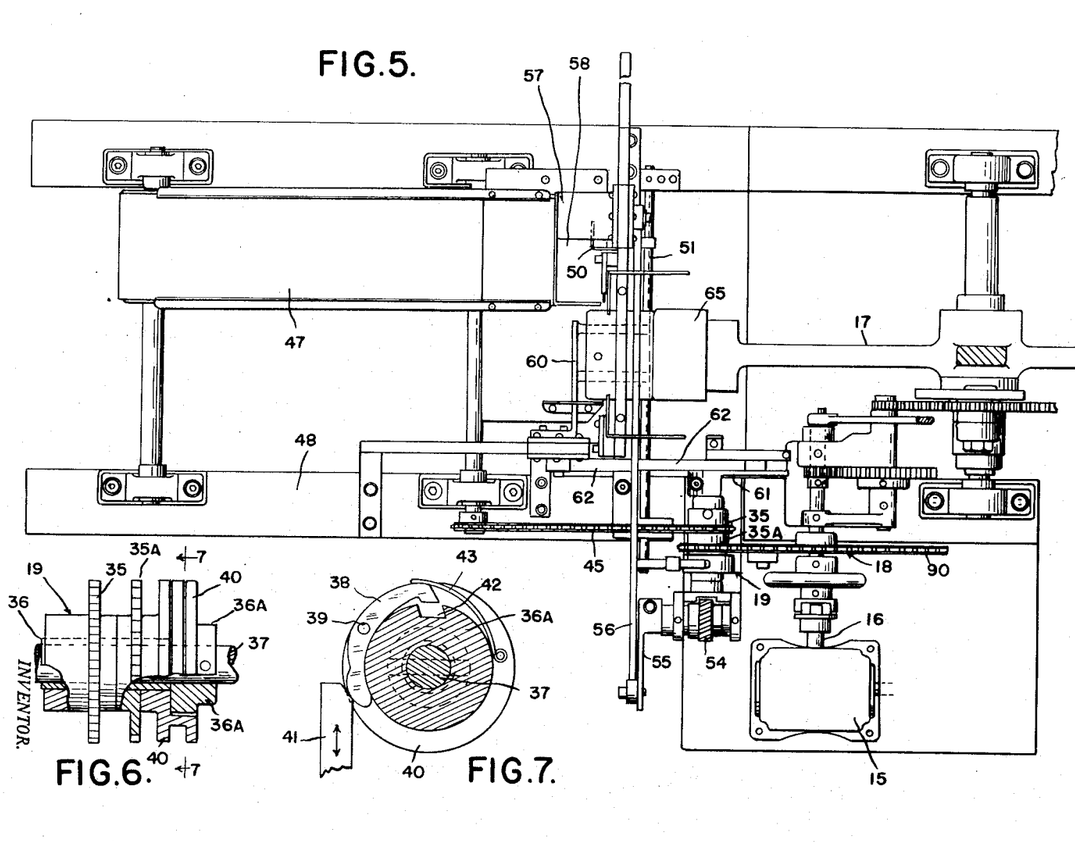
Fig. 5 is a plan view of the machine showing the feeding means for conveying the food parcels to be wrapped to said machine and the mechanism for controlling said machine operation.
Fig. 6 is a fragmentary detail view of the clutch mechanism.
Fig. 7 is a further detail sectional view of the clutch mechanism and taken substantially on the line 7—7 of Fig. 6.
Figure 8:
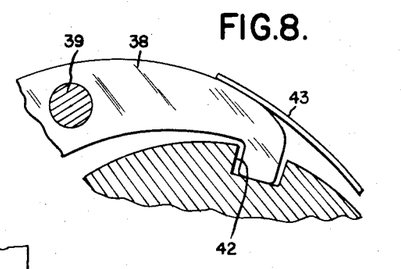
Fig. 8 is an enlarged detail view, partly in section of the pawl member of said clutch mechanism.

These end heaters 116 are illustrated in Fig. 2 and comprise standard heating elements which are preferably yieldingly urged against the flap to apply heat and pressure thereto.

The end heaters are mounted on the collars 117, which collars are urged toward each other and held in pressure relation with respect to the packages which are being wrapped by means of cams 118 carried on the shaft 119. A handle 120 is secured to shaft 119 and by quickly throwing over the handle or holding same, the cams 118 may be rotated permitting the springs 121 to separate the heaters from the package. Likewise a crank 122 is mounted on the shaft 119 and connects with the heaters 101 to move all side heating elements away from the food parcel.

The operation of the handle 120 is preferably manual and it is moved only in the event the machine stops for any reason whatsoever while butter or other types of food parcels are still in the machine, and in the heating zone. It is only necessary to move these heaters a slight way from the food parcel which is being packaged in order to prevent the heat from affecting the food, or from driving the wax into the paper, preventing a good seal.

As the food parcel is passed through the last heater which completely seals the wrapping material about the food product, which is encased therein, the same is ejected from the carrier 65 onto an ejector chute 130. This is accomplished by providing an ejector operated in timed relation with the machine so that as the packaged food parcel comes into alignment with the ejector chute 130, the wheel 17 which carries carrier 65 comes momentarily to rest.

The ejector comprises a yoke 131 which straddles the carrier 65 and the two arms of said yoke each carry a pin 132 which are moved through the slots 133 in the base or bottom of the carrier 65 and engage with the packaged food parcel to eject same from the carrier. The ejector is mounted on shaft 134 which is rocked by means of a crank 135 connected by a link 136 to a crank 137 carried on the shaft 92 which is continuously rotated.

In heat sealing packages of this character, using a pretreated packaging material embodying a wax coating, a quick chill will form more or less large wax crystals resulting in a weak bond. A gradual cooling forms a small wax crystal resulting in a strong bond. It is found that best results are obtained by controlling the cooling, and as shown in Fig. 2, this is best accomplished by providing extensions on the heaters, which are preferably constructed of stainless steel plate. Extensions S-1 carried by heaters 116 of a stainless steel plate engage the top fold after same passes out from under heaters 101, a spring 140, suitably anchored to shaft 117, pressing on the extension S-1 to bear against the top fold of the package. Likewise spring pressed extensions S-2 are also carried by the heaters 116 to bear against the end folds of the package.

Heat travels relatively slowly through these extensions S-1 and S-2 and consequently the ends of these extensions by which the package is last to pass, is relatively cool. Stainless steel, being of relatively low heat conductivity, lends itself exceptionally well for this purpose. Thus, these stainless steel extensions, acting as spring pressure plates, holds the package folds in place after the package leaves the heaters until the sealed folds slowly cool sufficiently to form the required strong bond. These extensions are rather hot at one end close to the heater and practically cold at the end remote from the heater. These extensions are only a few inches long and serve to very efficiently control the cooling rate of the seal.

I claim:

1. In a machine for wrapping butter, frozen food or other preformed products, a movable carrier having a plurality of U-shaped members for carrying the preformed products partially enfolded in a prefabricated sheet of wrapping material, opposite edge portions of said material projecting outwardly of the carrier member and the preformed product carried thereby, means for indexing said carrier, and a material folding device positioned to cooperatively coact with said machine operation and comprising a one-piece, C-shaped oscillating finger driven by said machine and movable generally in the same direction as the direction of travel of said carrier member during half its stroke, said finger during said half being moved to initially engage the rear flap of said wrapping paper when said carrier member is substantially at rest and to fold said flap over said product, said finger subsequently further advanced during said half its stroke as said carrier member is moved to retain said folded flap in position, a heater assembly fixedly mounted on said machine and located so that said carrier operates to move said U-shaped members under same, said other flap of said wrapping material being engaged by said heaters and folded over said other folded flap to be heat-sealed thereto under pressure as said enveloped product passes under said heater assembly.

2. In a machine for wrapping butter, frozen foods or other preformed products, a movable carrier having a plurality of U-shaped members for carrying the preformed products partially enfolded in a prefabricated sheet of wrapping material, opposite edge portions of said material projecting outwardly of the carrier member and the preformed product carried thereby, means for indexing said carrier, and a material folding device positioned to cooperatively coact with said machine operation and comprising an oscillating finger driven by said machine and movable generally in the same direction as the direction of travel of said carrier member during half its stroke, said finger being moved in said direction to initially engage the rear flap of said wrapping paper when said carrier member is substantially at rest and to fold said flap over said product, said finger subsequently advanced in said direction as said carrier member is moved to retain said folded flap in position, a heater assembly fixedly mounted on said machine and located so that said carrier operates to move said U-shaped members under same, said other flap of said wrapping material being engaged by said heaters and folded over said other folded flap to be heat sealed thereto under pressure as said enveloped product passes under said heater assembly, said finger comprising a C-shaped element, an oscillatable shaft to which said finger is secured, an arm on said shaft, a rotating shaft driven by said machine, a crank carried thereby, a link connecting said crank to said arm for oscillating the arm upon rotation of said rotating shaft, said oscillatable shaft being located at a point aligned with the U-shaped members when one thereof comes momentarily to rest.

3. In a machine for packaging preformed food parcels of butter, frozen foods or other preformed products, comprising mechanism for conveying said preformed products through said machine to package same, a source of power, and means for drivingly connecting said machine with said source of power, said driving means comprising a driving member connected with and driven at all times from said source of power, a driven member, means drivingly connecting said driven member to the various instrumentalities of said machine to be driven, and normally disengaged clutch means for connecting said driving and driven members said clutch means including a notch in said driving member, a pawl pivotally mounted on said driven member and biased to enter said notch, a cam biased to operative position for engaging said pawl to disengage it from said notch, said cam being movable to an inoperative position, a conveyor belt for feeding said preformed products to said machine to be packaged thereby, and a tripping device actuated by the friction between at least one of said products and said conveyor belt for actuating said cam to said inoperative position to retain said driving and driven members in driving relation as long as said preformed products are fed to said machine and to release the clutch by permitting said cam to move to operative position when no such products are being fed to the machine.

4. In a machine for packaging preformed parcels of butter, frozen foods or other preformed products comprising mechanism for conveying said preformed parcels through said machine to package same, a source of power, and means for drivingly connecting said machine with said source of power, said driving means comprising a driving member connected with and driven at all times from said source of power, a driven member, means drivingly connecting said driven member to various instrumentalities of said machine to be driven, and clutch means for connecting said driving and driven members, means for feeding said preformed parcels to said machine to be packaged thereby, said parcels moved continuously to said machine, an abutment on said machine against which said parcels are stacked, a trip supported in juxtaposition to said abutment and by the friction between said parcels and said feeding means actuated when said parcels are present in said feeding means and moved thereby into position against said abutment, and means operatively connecting said trip to the clutch means, one of said machine instrumentalities comprising a parcel transfer mechanism operable to move said parcel into position adjacent to the mechanism which conveys the parcels through said machine, and a ram device connected with said driven member and actuated thereby in timed relation with said transfer mechanism to inject the parcel into said parcel conveying mechanism of said machine.

5. In a machine for packaging preformed parcels of butter, frozen foods or other preformed products comprising mechanism for conveying said preformed parcels through said machine to package same, a source of power, and means for drivingly connecting said machine with said source of power, said driving means comprising a driving member connected with and driven at all times from said source of power, a driven member, means drivingly connecting said driven member to various instrumentalities of said machine to be driven, and clutch means for connecting said driving and driven members, means for feeding said preformed parcels and the like to said machine to be packaged thereby, said parcels moved continuously to said machine, an abutment on said machine against which said parcels are stacked, a trip supported in juxtaposition to said abutment and constructed and arranged to be actuated by friction from said feeding means when said parcels are present therein and moved into position against said abutment, and means operatively connecting said trip to the clutch means, one of said machine instrumentalities comprising a parcel transfer mechanism operable to move said parcel into position adjacent to the mechanism which conveys the parcels through said machine, a ram device connected with said driven member and actuated thereby in timed relation with said transfer mechanism to inject the parcel into said parcel conveying mechanism of said machine, and means operated by said driven means to convey a prefabricated sheet of wrapping material and position same ahead of said ram device, said last mentioned means operable only when said transfer mechanism is operated.

THOMAS B. DALTON.

References Cited in the file of this patent

UNITED STATES PATENTS

| Number | Name | Date |
|---|---|---|
| 501,603 | Honiss | July 18, 1893 |
| 787,379 | Hopkins | Apr. 18, 1905 |
| 1,132,164 | Coon | Mar. 16, 1915 |
| 1,140,620 | Seator | May 25, 1915 |
| 1,217,694 | Bracy | Feb. 27, 1917 |
| 1,234,722 | Bracy | July 31, 1917 |
| 1,254,895 | Ferguson | Jan. 29, 1918 |
| 1,270,416 | Johnson | June 25, 1918 |
| 1,287,124 | Smith | Dec. 10, 1918 |
| 1,626,386 | Bronander | Apr. 26, 1927 |
| 1,784,835 | Harris | Dec. 16, 1930 |
| 1,883,229 | Bent | Oct. 18, 1932 |
| 2,016,627 | Conte et al. | Oct. 8, 1935 |
| 2,080,834 | Petskeyer | May 18, 1937 |
| 2,187,123 | Harm | Jan. 16, 1940 |
| 2,373,655 | Bronander | Apr. 17, 1945 |
| 2,443,952 | Gilbert | June 22, 1948 |